United States Patent [19]

Decker

[11] Patent Number: 5,505,756
[45] Date of Patent: Apr. 9, 1996

[54] RAMP DISCHARGE OUTLET AIR PRECLEANER

[75] Inventor: William K. Decker, Cambridge, Wis.

[73] Assignee: American Farm Implement & Specialty, Inc., Janesville, Wis.

[21] Appl. No.: 406,077

[22] Filed: Mar. 17, 1995

[51] Int. Cl.[6] .................................................. B01D 45/00
[52] U.S. Cl. ............................... 55/399; 55/404; 55/430; 55/456
[58] Field of Search .................................. 55/385.3, 394, 55/396, 399, 404, 430, 451, 454, 456, 457, 449

[56] References Cited

U.S. PATENT DOCUMENTS

| | | | |
|---|---|---|---|
| 1,669,417 | 5/1928 | Le Grand | 55/394 |
| 2,193,479 | 3/1940 | Donaldson . | |
| 2,304,778 | 12/1942 | Cresswell . | |
| 2,417,130 | 3/1947 | Russell . | |
| 2,973,830 | 3/1961 | Gruner . | |
| 3,552,102 | 1/1971 | Araki . | |
| 3,670,480 | 6/1972 | Petersen | 55/430 |
| 3,740,932 | 6/1973 | Borsheim | 55/394 |
| 3,791,112 | 2/1974 | Lidstone | 55/337 |
| 3,792,573 | 2/1974 | Borsheim | 55/399 |
| 3,895,930 | 7/1975 | Campolong | 55/394 |
| 3,973,937 | 8/1976 | Petersen | 55/449 |
| 4,013,137 | 3/1977 | Petersen | 55/342 |
| 4,135,897 | 1/1979 | Gondek | 55/404 |
| 4,138,761 | 2/1979 | Nauta | 15/353 |
| 4,197,102 | 4/1980 | Decker | 55/449 |
| 4,201,557 | 5/1980 | Petersen | 55/327 |
| 4,248,613 | 2/1981 | Linhart | 55/394 |
| 4,373,940 | 2/1983 | Petersen | 55/328 |
| 4,459,141 | 7/1984 | Burrington et al. | 55/391 |
| 4,547,207 | 10/1985 | Petersen | 55/394 |
| 5,022,903 | 6/1991 | Decker | 55/404 |
| 5,449,391 | 9/1995 | Decker | 55/404 |

FOREIGN PATENT DOCUMENTS 683986 6/1930 France .
483058 7/1953 Italy .

OTHER PUBLICATIONS

Advertisements for Best-Ex Centri Air Pre-Cleaners, by Best-Ex, Inc. before 1990.
Photographs of Centri Air Pre-Cleaner sold by Best-Ex, Inc. in the United States.
Photocopy of cutaway view of the Centri Air Pre-Cleaner sold by Best-Ex, Inc.
Advertisement, Price List, and Specifications for Turbo Pre-Cleaners by Sureco, Mar. 1, 1987.

Primary Examiner—C. Scott Bushey
Attorney, Agent, or Firm—Foley & Lardner

[57] ABSTRACT

A ramp outlet air precleaner has a base assembly, a dome shaped hood, and a rotor assembly. The base assembly includes an inner circumferential wall and an outer circumferential wall, the inner circumferential wall defining an air outlet port. Angled web supports connect the outer circumferential wall to the inner circumferential wall and the arrangement forms air inlet ports that direct air upon the rotor assembly. A ramp extends perpendicularly and axially from the outer circumferential wall and, starting at the top of the outer circumferential wall, the ramp surface winds around the outer circumferential wall in a spiral, terminating near the bottom of the outer circumferential wall below its starting point. The two ends of the ramp form the top and bottom of a particulate discharge port gap. The rotor assembly includes a hub that has arms extending outwardly therefrom. Air drawn into the inlet ports causes rotation of the hub and arms, with the arms flinging particulates outwardly toward the inner surface of the hood where they fall toward the discharge ramp. The spiral shape of the ramp surface creates significant velocity in the particulates, rapidly removing them out of the path of incoming air and discharging them through the discharge port.

13 Claims, 3 Drawing Sheets

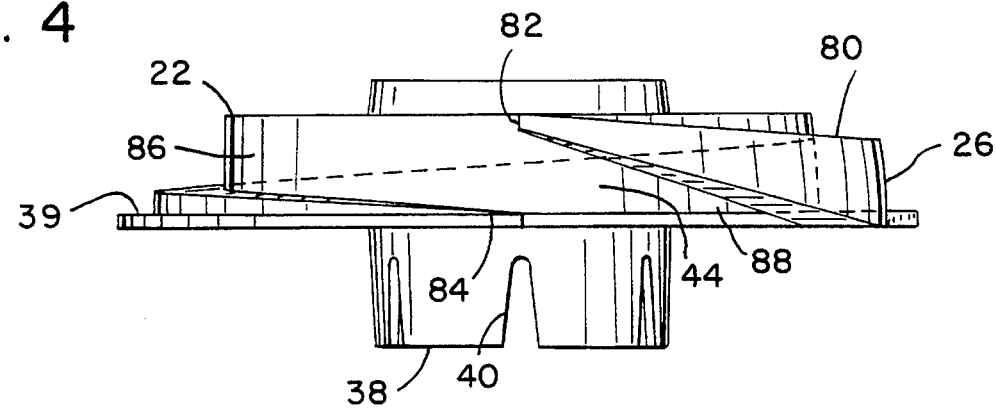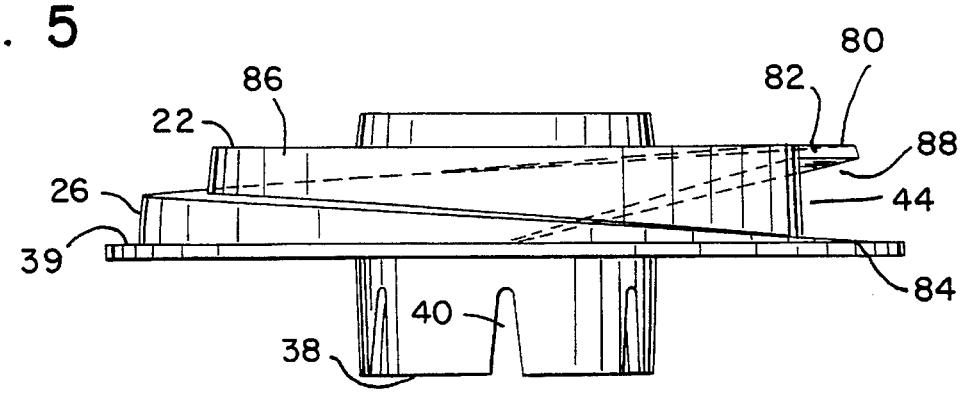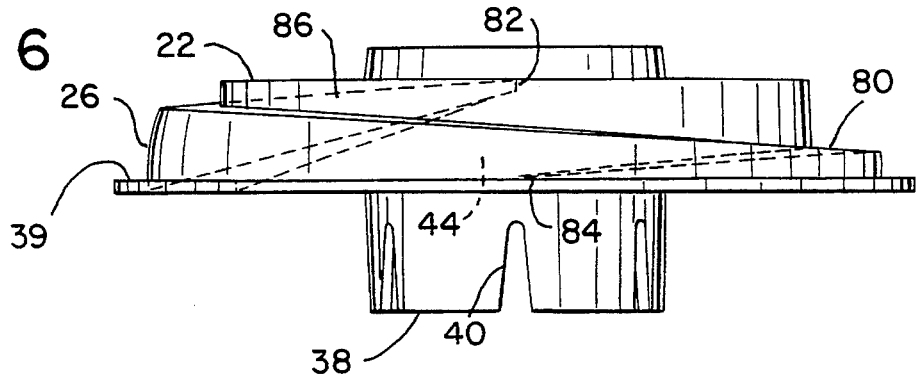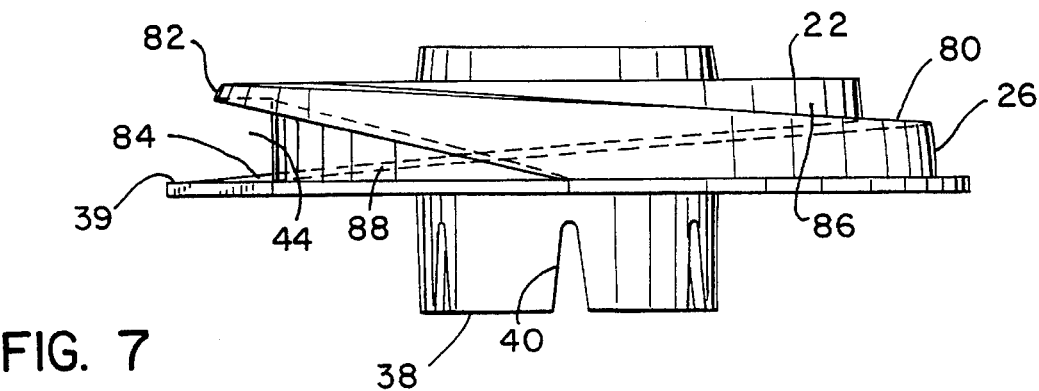

RAMP DISCHARGE OUTLET AIR PRECLEANER

FIELD OF THE INVENTION

This invention relates generally to devices for separating particulates from the air such as dirt, dust, rain, and snow before they enter the air stream of an engine, air compressor, or similar apparatus.

BACKGROUND OF THE INVENTION

Air precleaners are devices typically used in the removal of dust, dirt, sand, rain, snow, and other airborne particulates in the air prior to the flow of air to the carburetor of an internal combustion engine. Such precleaners promote more efficient combustion and longer engine and filter life. The efficiency of the precleaner is determined by the percentage of particulates that are removed from the intake air by the precleaner. The more efficient the precleaner, the lesser the amount of particulates that must be removed by the air filter.

The precleaners of the prior art have various configurations that are employed as a means of removing the particulates from the air. Examples of precleaners or particle separators are shown in U.S. Pat. Nos. 2,193,479; 2,304,778; 2,417,130; 2,973,830; 3,552,102; 3,670,480; 3,740,932; 3,791,112; 3,973,937; 4,138,761; 4,197,102; 4,547,207; and 5,022,903.

Although such precleaners may adequately perform with respect to particulate removal, this is sometimes accomplished at the expense of a reduced air flow, i.e., the precleaner itself may become an air restriction. Some precleaners are also usable when positioned in only one orientation.

Accordingly, a need has existed for an air precleaner that efficiently removes particulates from the air yet itself results in a minimal air restriction. What is particularly needed is an air precleaner which is capable of efficiently removing particulates from the air without reintroducing the removed particulates into the path of incoming air, thereby reducing efficiency and restricting air flow.

SUMMARY OF THE INVENTION

In accordance with the present invention, an air precleaner includes a dome shaped hood, a rotor assembly, and a base assembly with a ramp shaped discharge port for particulate matter which extends substantially around the outer circumstance of the base assembly. The base assembly also has an inner circumferential wall and an outer circumferential wall, the inner circumferential wall defining an air outlet port, and the outer circumferential wall defining the inner circumference of the discharge port ramp. Angled web supports connect the outer circumferential wall to the inner circumferential wall and their arrangement forms air inlet ports that direct air upon the rotor assembly. The rotor assembly includes a hub having a plurality of arms extending therefrom that rotates upon an axle when struck by air entering through the inlet ports. Each arm preferably includes two blades oriented perpendicularly to one another: a first blade in a plane radial to the hub, i.e., a plane perpendicular to the axis of rotation, and a second blade in a plane axial to the hub, i.e., a plane parallel to and preferably coincident with the axis of rotation. The first blade preferably extends perpendicularly from the front side of the second blade in a direction corresponding to the direction of rotation of the rotor assembly; for example, if the rotor assembly is to rotate in a counterclockwise direction, the first blade will extend from the second blade in a counterclockwise direction. The backside of the second blade does not have a blade or airfoil extending from it, so that air flowing past the backside of the second blade is substantially unobstructed.

The discharge port ramp winds around the outer circumference of the outer circumferential wall of the base assembly in the same direction as the rotation of the rotor assembly. Starting at the top of the outer circumferential wall the ramp terminates in a gap at the bottom of the wall below its starting point, approximately 360 degrees removed. The starting and terminal ends of the discharge port ramp define respectively the top and bottom of the particulate discharge port itself.

In the operation of the air precleaner of the present invention, air to be cleaned is drawn through the air inlet ports and directed toward the rotor assembly. Air incident upon the arms of the rotor assembly causes rotation of the rotor assembly, so that particulate matter is flung toward the hood. The arms of the rotor preferably each have a large surface area panel integrally formed at the outer most end of each arm to increase the amount of inertia of the rotor and provide enhanced particulate sweeping action at the radial periphery of the rotor. The panels preferably lie in an axial plane. The rotor preferably also includes a tab on each arm which extends downwardly from the second blade at a position adjacent to the hub. The tabs, which can generally lie in, or be bent backwardly from, an axial plane, can be sized to provide control of the typical rotational speed of the rotor. These tabs extend down into the throat of the air outlet port.

Particulates are driven by the rotor out to the hood and then down the inner surface of the hood to be discharged through the ramp discharge port and exit through the gap. The spiral shaped discharge path creates significant velocity for the particulates. The particulates are thus rapidly drawn to the ramp discharge port, located beyond the periphery of the air inlet ports, and thus out of the path of incoming air. Cleaned air is drawn through the air outlet port by for example, the vacuum draw of an engine to which the air precleaner is attached.

The precleaner of the present invention provides restriction of the air entering and exiting the precleaner which is generally as low as or less than existing precleaners, thus allowing complete and efficient combustion of the fuel. Nonetheless, the precleaner concurrently provides more efficient removal of particulates than existing precleaners.

Further objects, features, and advantages of the invention will be apparent from the following detailed description when taken in conjunction with the accompanying drawings.

BRIEF DESCRIPTION OF THE DRAWINGS

In the drawings:

FIGS. 4–7 are a series of side views of the base assembly of the air precleaner of the invention, showing the spiral of the ramp discharge port at various rotations of the base assembly.

DETAILED DESCRIPTION OF THE INVENTION

Figure 1:
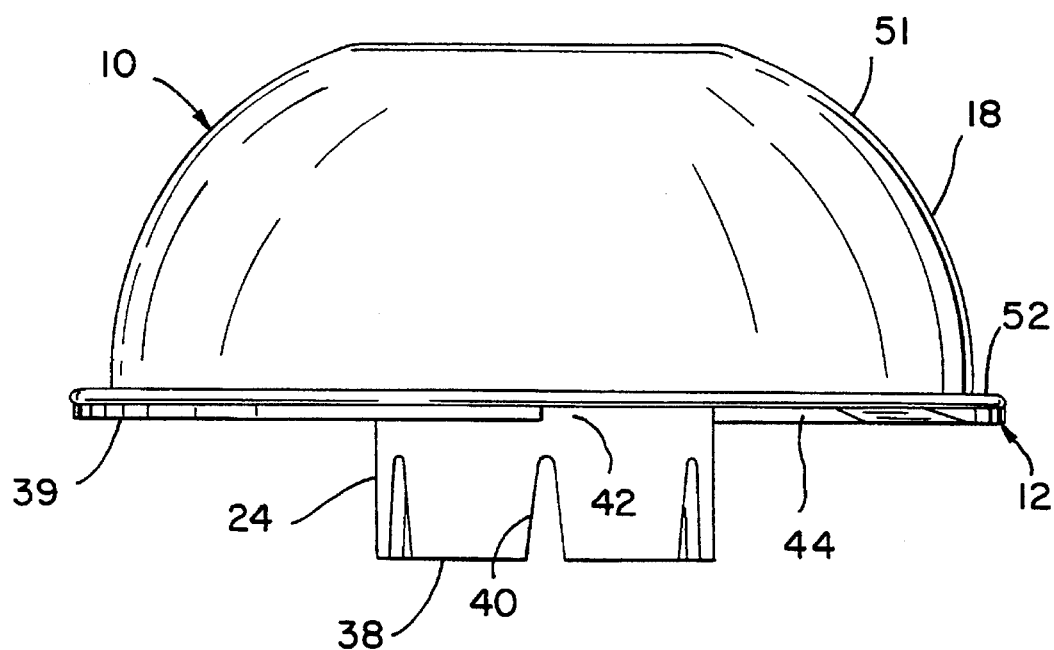
FIG. 1 is a side view of the air precleaner of the present invention.
Figure 2:
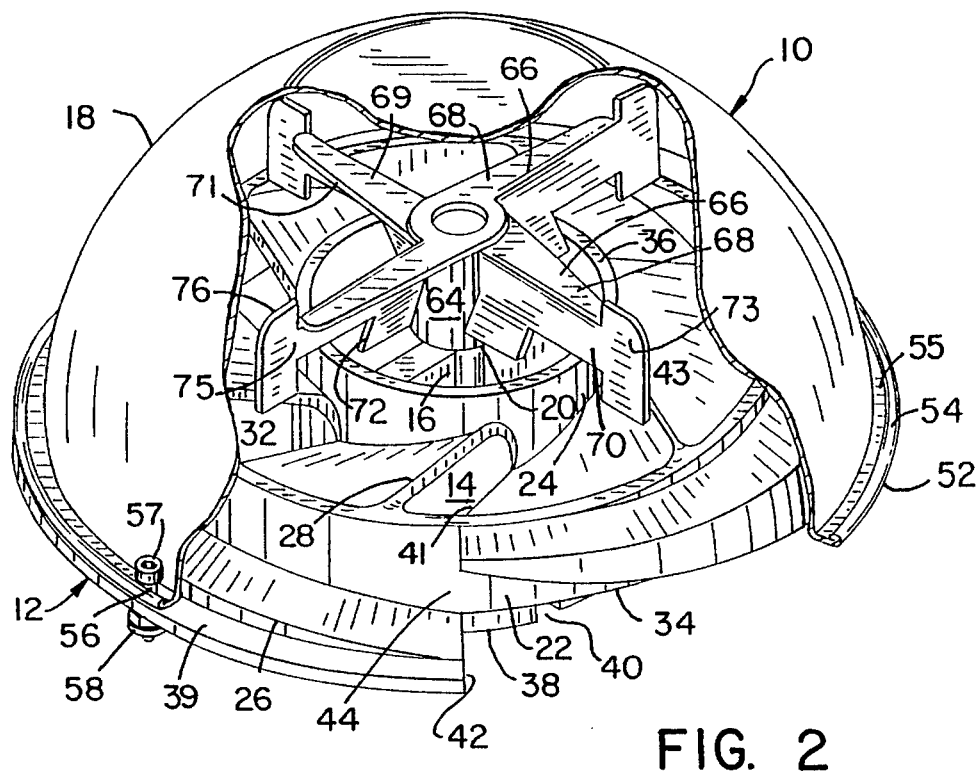
FIG. 2 is a perspective view of the air precleaner of the present invention with portions of the hood of the precleaner being cut away to show internal parts of the precleaner.

With reference to the drawings, FIGS. 1 and 2 show various views of the air precleaner of the present invention generally at 10. The air precleaner 10 comprises a base assembly 12 having air inlet ports 14 and an air outlet port 16, a hood 18 positioned above the base assembly 12, and a rotor assembly 20 that is rotatably mounted on the interior of the precleaner 10. The precleaner 10 is a device used for separating particulates from a carrier fluid. Where the carrier fluid is air, exemplary particulates include dust, dirt, sand, rain, snow, or any other airborne particulate matter.

Figure 3:
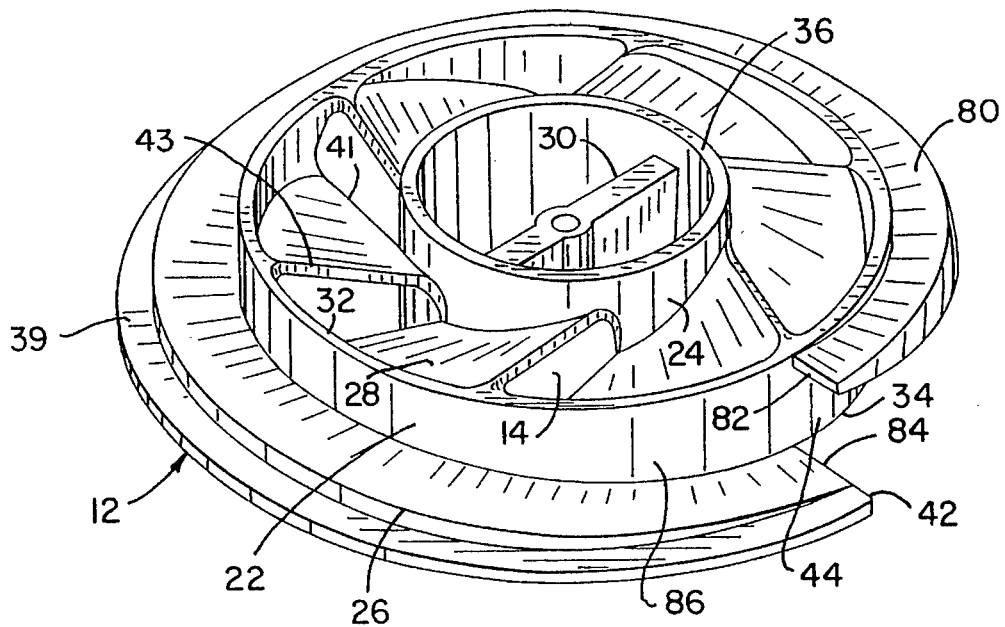
FIG. 3 is a perspective view of the base assembly of the air precleaner of the invention.

The base assembly 12, best shown in FIG. 3, is cast or formed in a single piece to include an outer circumferential wall 22, an inner circumferential wall 24, a plurality of web segments 28, a strut 30, and an outlet port ramp 26. In the orientation shown in the figures, the outer circumferential wall 22 has a top 32 and a bottom 34. The inner circumferential wall 24 has a top 36 and a bottom 38. A peripheral ledge 39 extends from the bottom 34 of the outer circumferential wall 22 to beyond the discharge port ramp 26. The peripheral ledge 39 may entirely circle the base 12 or may contain a gap 42 which corresponds to a discharge port gap 44. The web segments 28 connect the outer circumferential wall 22 to the inner circumferential wall 24 and, by their arrangement between the outer and inner circumferential walls 22 and 24, form the air inlet ports 14 that allow fluid communication from the exterior of the precleaner 10 to the interior of the precleaner 10. In the orientation shown in FIGS. 2 and 3, each of the web supports is angled from a low first edge 41 to a high second edge 43, the second edge 43 being located counterclockwise from the first edge 41. The web supports 28 are thus successively arranged in counterclockwise fashion in the area formed between the outer circumferential wall 22 and the inner circumferential wall 24. Each of the air inlet ports 14 are formed and bounded by the second edge 43 of one web support 28 and the first edge 41 of the succeeding counterclockwise web support 28. The air inlet ports 14 are also bounded by the outer circumferential wall 22 and the inner circumferential wall 24. There are six air inlet ports 14 in the precleaner 10 as depicted in FIG. 3, although other numbers are possible. The ports 14 are angled so that fluid is drawn in from the exterior of the precleaner 10 and directed at the rotor assembly 20, in a manner described below.

The inner circumferential wall 24 defines the air outlet port 16, with the bottom 38 of the inner circumferential wall 24 extending below the bottom 34 of the outer circumferential wall 22. The outlet port 16, as defined by the inner circumferential wall 24, is typically serially connected and fitted to the air intake of an engine, air compressor, or similar apparatus, so that the precleaner 10 acts to pre-clean the air prior to its entry to the apparatus. The operation of the precleaner 10 will be described in further detail below. The inner circumferential wall 24 preferably has longitudinal slots 40 that extend upward from the bottom 38 of the inner circumferential wall 24 so that the inner circumferential wall 24 may be more easily fitted over the top of the air intake of the engine, air compressor, or similar apparatus. For operational use a clamp or band is preferably wrapped circumferentially about the inner circumferential wall 24 in the region of the longitudinal slots 40 so as to tightly secure the inner circumferential wall about the air intake of the engine, air compressor, or similar apparatus. The outlet port 16 of the precleaner 10 is therefore in fluid communication with the air intake of the engine, air compressor, or similar apparatus. The strut 30, upon which the rotor assembly 20 is mounted, extends diametrically across the outlet port 16.

The hood 18 preferably has a dome shaped surface 51, terminating at a peripheral edge 52. "Dome shaped", as used herein, is defined to mean a shape that is hemispherical, convex, shaped like an inverted bowl, or to have portions that are represented by sections that are substantially hemispherical, convex, or shaped like an inverted bowl. The outer walls of the dome shaped hood 18 may also be cylindrical rather than continuously curved. The hood 18 encloses the entire upper surface of the base assembly 12, including the discharge ramp 26, and defines an air space above the base assembly 12 so that the air space and the inlet and outlet ports 14 and 16 and the discharge port gap 44 are in fluid communication. The peripheral edge 52 is preferably rolled to form a lip 54 and a circumferential channel 55 between the lip 54 and the domed surface 51. The hood 18 may then be attached to the base assembly 12 by bolts 56 that extend through the peripheral edge 52 and the ledge 39 of the base assembly 12, the bolts 56 each having heads at one end 57 that fit within the channel 55 to prevent rotation of the bolts. The bolts 56 are secured by nuts 58 at the end of the bolts 56 opposite the heads 57.

The rotor assembly 20 comprises a machined hub 64 with four arms 66 extending radially therefrom, the arms 66 being equal distant from each other to form an "x"-type configuration. It is also possible that more or less than four arms 66 could be used. Each of the arms has a first blade 68 and a second blade 70. The first blades 68 are in a plane radial to the hub 64, that is, a plane perpendicular to the axis of rotation of the rotor; the second blades 70 are preferably in planes axial to the hub 64, that is, planes parallel to and preferably coincident with the axis of rotation. The first blade 68 has a leading edge 71 and a trailing edge 69, wherein the leading edge 71 precedes the trailing edge 69 as each arm 66 moves along its circular path of rotation. The first blade 68 is preferably wedge shaped, being widest at the position at which it joins the hub 64 and tapering to a terminus of the leading edge 71 at a position adjacent to paddles 73 formed at the outer ends of the arms. The second blade 70 descends preferably perpendicularly from the trailing edge of the first blade 68 and has a front side 75 and a back side 76. In a base assembly 12 that is designed to create a counterclockwise rotor assembly 20 rotation (as in the base assembly shown in FIGS. 2 and 3), the first blade 68 protrudes from the front side of the second blade 70 in a counterclockwise direction, whereas the backside 76 of the second blade 70 is free of obstruction, and thus air flowing past the back side 76 is substantially unobstructed.

Each of the arms 66 also preferably has an integrally formed tab 72 that extends downwardly from the axial blade 70 in a manner as depicted in FIG. 2. The tabs 72 extend downwardly into the throat of the air outlet port 16. The tabs 72 are located proximate the hub 64 and are slightly bent or flared in a clockwise direction. The tabs 72 may also extend downwardly from the axial blade 70 in the axial plane, i.e., without a bend. A bent tab can be advantageous at high altitudes, where the angle of the tabs 72 may be increased to compensate for the lower intake air pressure and thereby maintain the rotational speed of the rotor assembly 20 at a desired high rate despite the low air density. It may be desirable, and is considered within the scope of the present invention, for the length of the tabs 72 to be selected for different applications. The size of the tabs 72 is related to the speed of the rotor assembly 20, which correspondingly affects the efficiency of the precleaner 10 for different altitudes of operation. In higher altitude applications, for example, longer tabs 72 are preferable.

Each of the arms 66 further preferably includes a paddle 73 extending from the outer end of the second blade 70. The paddle 73 provides increased surface area to meet the air drawn in from the air inlet ports 14, and thereby better utilize the force of the inlet airflow, and can help increase the rotational speed of the rotor assembly 20 and impel particulates toward the inner surface of the hood 12. The paddles 73 also add mass to each of the arms 66 and thereby increase the moment of inertia of the rotor assembly, helping to maintain a uniform rotational speed of the rotor assembly 20. An increased moment of inertia could also be obtained by replacing the paddles 73 with weights located on the ends of each rotor arms 66. However, the planar paddles 73 are preferred. While the paddles 73 may be placed anywhere along the second blade 70, greater rotational speed and a greater moment of inertia are obtained when the paddle 73 is located further from the hub 64. The paddles preferably have substantially larger axial dimension or "height" than the second blades 70, extending above and below the second blades as shown in FIG. 2.

The hub 64 is preferably mounted upon a precision ground axle by two highly ground precision shielded bearings (not shown). The axle is threaded at one end and is attached to the strut 30 that extends diametrically across the outlet port 16 by a nut (not shown).

The discharge port ramp 26, as shown in FIGS. 4–7 from several rotational angles, has an upper surface 80, a starting end 82 and a terminal end 84. The ramp 26 extends radially from the outer surface 86 of the outer circumferential wall 22 to the inner surface of the hood 18 and circumferentially around the outer circumferential wall 22. The upper surface of the ramp 80 is everywhere approximately perpendicular to the outer surface 86 of the outer circumferential wall 22. At the starting end of the ramp 82 the upper surface of the ramp 80 is approximately adjacent to the top 32 of the outer circumferential wall 22. As the surface of the ramp 80 winds around the outer circumferential wall 22 the surface 80 spirals downward toward the bottom 34 of the outer circumferential wall 22. At the terminal end 84 of the ramp the upper surface of the ramp 80 is approximately adjacent to the bottom 34 of the outer circumferential wall 22. The starting end of the ramp surface 82 is preferably located in approximately the same axial plane as the terminal end of the ramp surface 84, such that the ramp surface 80 creates an approximately 360 degree spiral between the outer surface 86 of the outer circumferential wall 22 and the inner surface of the hood 18. The ramp spirals downwardly in the same direction as the direction of rotation of the rotor arms so that particulates swirling downwardly along the inner surface of the hood continue their motion smoothly into the ramp region.

The discharge port gap 44 is bounded on the top by the starting end of the ramp 82, on the bottom by the terminal end of the ramp 84, and on the sides by the outer surface 86 of the outer circumferential wall 22, and the inner surface of the hood 18. As is shown in FIG. 4 an exhaust area 88 is created by removing a portion of the ramp 26 immediately adjacent to the discharge port gap 44 and below the starting end of the ramp 82. The exact size and shape of this exhaust area 88 is not significant, but the exhaust area should be sufficiently large to allow for particulates which have been removed from the air by the air precleaner to be freely discharged from the discharge port 44.

Because the spiraled surface of the ramp 80 increases the efficiency of the discharging of particulates by the air precleaner 10, a ramp in the form of a substantially two dimensional strip extending radially perpendicular to the outer surface 86 of the outer circumferential wall 22 and coiled in a spiral around the outer circumferential wall 22 between its outer surface 86 and the inner surface of the hood 18 may also be utilized rather than a ramp cast integrally with the rest of the base. If a coiled shelf is used instead of the integral ramp configuration shown, the mass of the casting forming the base 12 may be reduced and no machining of the ramp surfaces would be required.

In the operation of the precleaner 10, air that may contain particulate matter is typically drawn into the precleaner by vacuum pressure caused by an engine or similar device mounted below the air outlet port 16 of the precleaner 10. The air is thus drawn through the air inlet ports 14, the angling of the web supports 28 directing the air flow in a circular, counterclockwise direction within the precleaner 10. The airflow is directed against the blades 68 and 70, and the tabs 72, of the rotor assembly 20, thus causing the rotor assembly 20 to spin in a counterclockwise direction. Of course, the direction of the web supports 28 could be reversed, and the orientation of the parts of the rotor assembly 20 reversed, to provide rotation in the clockwise direction. If such were the case, the direction of the discharge ramp 26 spiral would also be reversed. The circular motion of the rotor assembly 20 impels the intake air into a circular motion, causing a centrifugal force to be exerted on particulates within the air that has been drawn into the precleaner 10. The particulates are thus flung outwardly against the hood 18. The configuration of the hood 18 forces particulates down the interior of the hood surface toward the upper surface 80 of the discharge ramp 26. The upper surface 80 of the ramp 26 creates a spiral path toward the discharge port gap 44. This spiral creates significant velocity in the particulates being discharged, thereby rapidly removing them out of the path of incoming air from the air inlet ports 14, and discharging them out of the air precleaner 10 through the discharge port 40 in a direction generally downwardly and tangential to the circumference of the air precleaner. The approximately 360 degree full spiral of the ramp surface 80 has been found to increase the efficiency of the air precleaner 10 over those having discharge ports of conventional designs, e.g., a discharge gap which extends partially or entirely around the periphery of the precleaner at the same level. The air cleaned by the air precleaner 10 is then drawn by the vacuum effect of the engine through the air outlet port 16 into the intake of an engine or a similar apparatus. A partial ramp, i.e., one less than 360° would generally not be as effective in generating a high discharge velocity as the full spiral, and thus a substantially full spiral is preferred although some advantage may be obtained with less than a 360° spiral.

The above described precleaner of the present invention is an effective means of pre-cleaning air that is to be introduced into an engine, air compressor, or similar apparatus, and is efficient even at high altitudes. It is to be understood that the precleaner 10 of the present invention is not limited merely to applications within air and to those applications that remove particles that are typically contained within air. The precleaner 10 will work in applications involving other fluids as well. Though the figures and the corresponding text have for example assign a "top" a "bottom", and corresponding identifying labels to the precleaner 10, these have been used for illustrative purposes inasmuch as the air precleaner can be mounted and will function in any position. Further, though the air inlet ports 14, the rotor assembly 20, and the discharge ramp have been depicted to cause air flow and rotation of the rotor assembly 20 and particulate discharge in a counterclockwise direction, a precleaner with air flow and rotation of the rotor assembly and discharge of particles in a clockwise direction is, as noted above, within the scope of the present invention.

It is further understood that the invention is not confined to the particular construction and arrangement of parts herein illustrated and described, but embraces such modified forms thereof as come within the scope of the following claims.

What is claimed is:

1. An air precleaner that separates particulates from air, comprising:

(a) a base assembly having an inlet port through which air enters the precleaner, an outlet port through which air exits the precleaner, and a ramp coiled in a spiral around an outer circumference of the base assembly and terminating in a discharge port gap through which particulates exit the precleaner in a generally tangential direction with respect to the outer circumference of the base assembly;

(b) a hood that defines an air space above the base assembly so that the air space and the inlet and outlet ports and the discharge port are in fluid communication, the hood positioned above the base so as to enclose the discharge ramp; and (c) a rotor assembly that is rotatably mounted within the air space that is defined by the hood and that rotates when air enters through the inlet port to fling particulates outward toward the hood and downwardly toward and along the ramp for expulsion through the discharge port gap, wherein the rotor assembly further includes, an axle mounted to the base assembly, a hub that is rotatably mounted upon the axle, and an arm that is attached to the hub in the path of air entering through the inlet port, the air causing the hub to rotate upon the axle and the arm to fling particulates outward, wherein the arm includes at least an axial blade that is in a plane which intersects the hub along the axis of rotation of the hub.

2. The air precleaner of claim 1 wherein the discharge ramp comprises a shelf formed integrally with and extending perpendicularly from the outer circumference of the base assembly such that a first end of the shelf is located near a top of an outer surface of the base assembly and a second end of the shelf is located near a bottom of the outer surface of the base assembly and wherein the first end of the shelf and the second end of the shelf are separated angularly by approximately 360 degrees and wherein the first end of the shelf and the second end of the shelf define a top and a bottom of the discharge port gap.

3. The air precleaner of claim 1 wherein there are a plurality of air inlet ports.

4. The air precleaner of claim 3 wherein the base assembly further comprises;

(a) an inner circumferential wall that defines the outlet port; and (b) an outer circumferential wall that is connected to the inner circumferential wall by web supports, the inlet ports being defined by the web supports and the web supports being angled to direct air upon the rotor assembly to cause the rotor assembly to rotate, and wherein the discharge ramp is coiled around an outer circumference of the outer circumferential wall on a side of the outer circumferential wall opposite to that of the web supports.

5. The air precleaner of claim 4 wherein the inner circumferential wall has a strut that extends diametrically across the outlet port upon which the rotor assembly is mounted.

6. The air precleaner of claim 1 wherein the hood is dome shaped.

7. The air precleaner of claim 1 wherein the axial blade further includes a tab that extends downward from the blade proximate to the hub.

8. The air precleaner of claim 7 wherein the tab is bent in a direction against the rotation of the rotor assembly.

9. The air precleaner of claim 1 wherein there are four arms attached to the hub, each of the arms being equal distant from the others.

10. The air precleaner of claim 1 wherein the arm further includes a paddle extending outwardly generally in the same plane as and from an outer end of the axial blade.

11. The air precleaner of claim 10 wherein the paddle has a larger axial dimension than the axial dimension of the axial blade from which it extends.

12. The air precleaner of claim 1 wherein the arm includes a radial blade mounted to the hub in a plane parallel to an end of the hub and which is wedge shaped and tapers from its widest dimension where it joins the hub to terminate at a position meeting the axial blade.

13. The air precleaner of claim 12 wherein the radial blade extends from a front side of the axial blade in a direction corresponding to the direction of hub rotation and a backside of the axial blade is free of obstruction so that air flowing past the backside of the axial blade is substantially unobstructed.

* * * * *